United States Patent [19]

Stuart

[11] Patent Number: 4,489,416
[45] Date of Patent: Dec. 18, 1984

[54] EQUALIZATION SYSTEM FOR MODEMS IN A POLLED ARRANGEMENT

[75] Inventor: Richard L. Stuart, Columbia, Md.

[73] Assignee: Rixon, Inc., Silver Spring, Md.

[21] Appl. No.: 476,682

[22] Filed: Mar. 18, 1983

[51] Int. Cl.³ .............................................. H04B 3/04
[52] U.S. Cl. .................. 375/13; 340/825.08; 375/8; 333/18
[58] Field of Search ............... 375/7, 8, 11, 12, 13, 375/14, 15, 16; 340/825.08; 333/18; 179/170.2

[56] References Cited

U.S. PATENT DOCUMENTS

| | | | |
|---|---|---|---|
| 3,566,271 | 2/1971 | Whang et al. | 375/12 |
| 3,593,142 | 7/1971 | Freeny | 375/12 |
| 3,706,076 | 12/1972 | Schuster | 364/724 |
| 3,864,632 | 2/1975 | Chang | 375/12 |
| 3,962,637 | 6/1976 | Motley et al. | 375/14 |
| 4,004,226 | 1/1977 | Qureshi et al. | 375/13 |
| 4,009,356 | 2/1977 | Borysiewicz et al. | 179/170.2 |
| 4,044,307 | 8/1977 | Borysiewicz et al. | 375/13 |
| 4,053,837 | 10/1977 | Ryan et al. | 375/15 |
| 4,201,959 | 5/1980 | Niiro et al. | 333/16 |
| 4,285,061 | 8/1981 | Ho | 375/15 |
| 4,416,015 | 11/1983 | Gitlin | 375/14 |

*Primary Examiner*—Benedict V. Safourek
*Attorney, Agent, or Firm*—Saidman, Sterne, Kessler & Goldstein

[57] ABSTRACT

In a system in which a central modem individually polls a number of remotely located modems for data, an adaptive equalizer in the central modem is initially trained to minimize communication link interference from a remote modem and develops a set of equalizer coefficients based on the initial training which is transmitted to the remote modem and stored there for future use while the central modem goes on to do the same with other remote modems. When a remote modem is polled, the stored equalizer coefficients are used to set the adaptive equalizer of the remote modem so the adaptive equalizer of the central modem does not have to be retrained for each individual remote modem.

5 Claims, 8 Drawing Figures

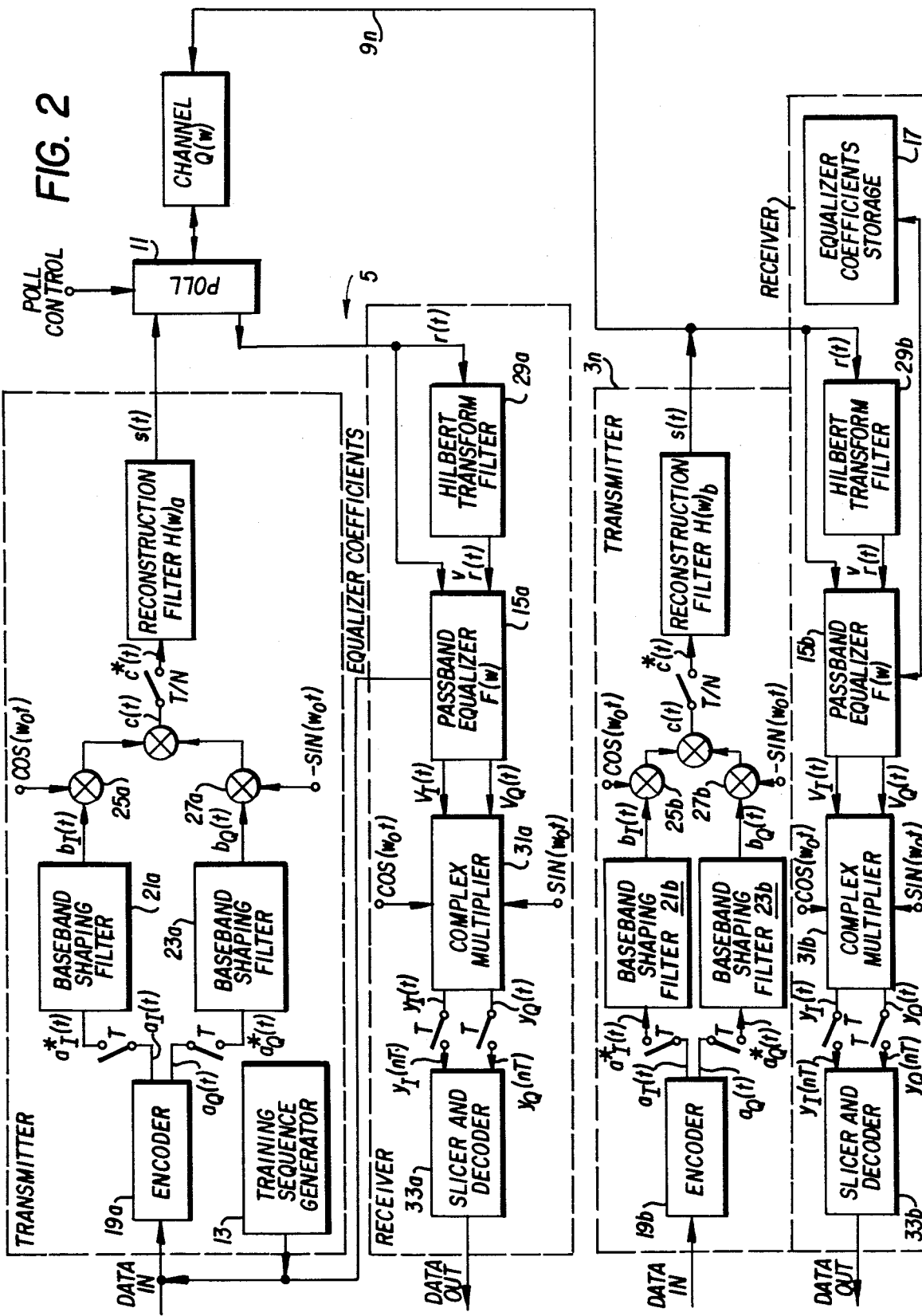

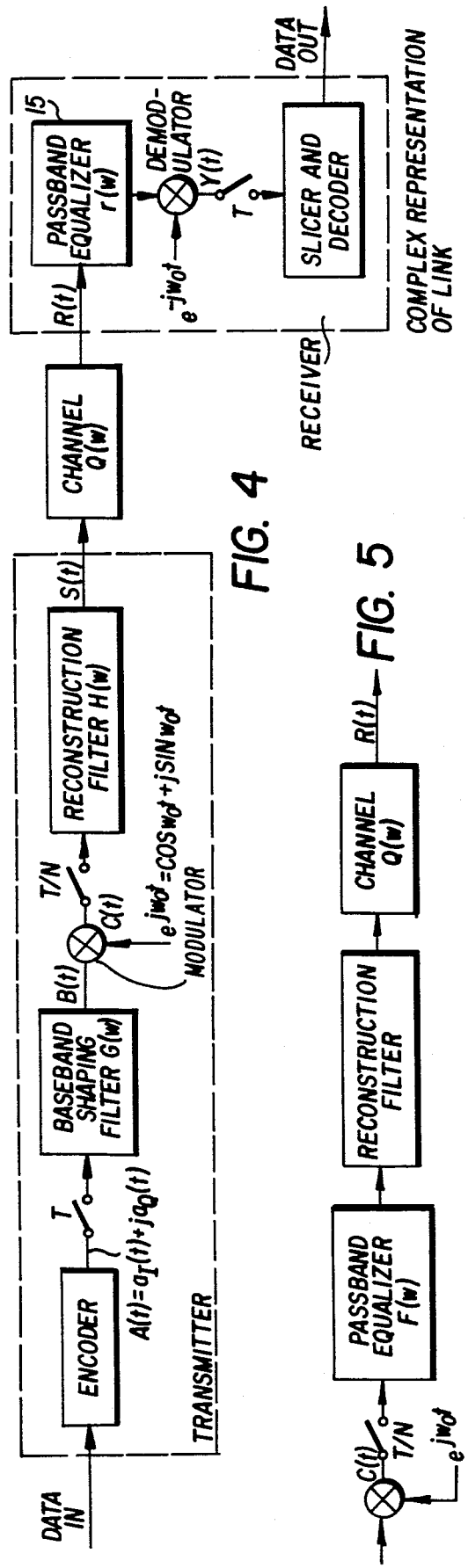
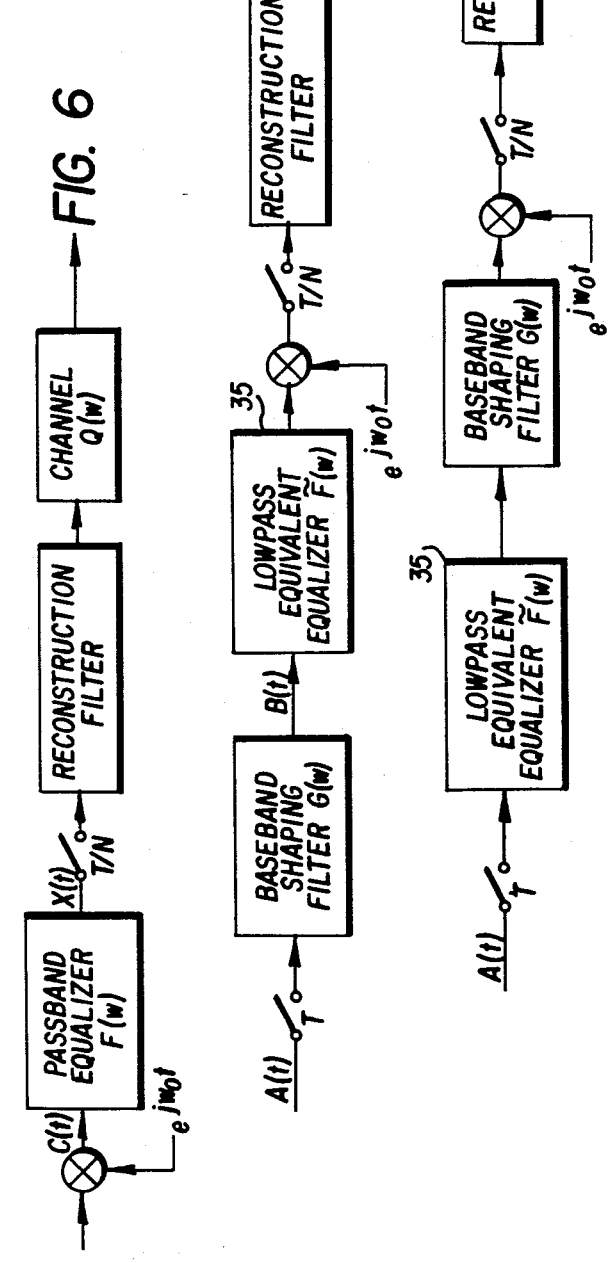
FIG. 4
FIG. 5
FIG. 6
FIG. 7
FIG. 8

EQUALIZATION SYSTEM FOR MODEMS IN A POLLED ARRANGEMENT

BACKGROUND OF THE INVENTION

1. Field of the Invention

The present invention relates to data communication systems, and more particularly to data communication systems in which a central modem (modulator-demodulator) communicates with a number of remotely located modems and data stations.

2. Background of the Invention

In data communication systems, it is frequently desirable to be able to communicate data to and from a number of remotely located points and a central location. For example, a number of date entry and/or display terminals can be connected via individual data communication channels (e.g. telephone lines) to a central processing unit, computer or other data terminal.

As is well known, because of various constraints digital data signals cannot be sent directly over band-limited telephone lines but rather must be changed into a form suitable for transmission. Whereby two-way transmission over such data communication channels is desired a device called a modulator-demodulator (modem) is used at each end of the line to convert data signals into a form suitable for transmission over a telephone line and to convert signals received over the telephone line back into a digital data stream suitable for processing by a computer or other data handling apparatus. Each modem thus includes a suitable data transmitter and receiver section.

As is well known, the electrical characteristics of telephone lines which are used for data transmission can vary according to the distance from the remote station to the central station, the time of day, and whether a special leased line is used or the central station is dialed up through the telephone system's direct distance dialing network. Especially in the latter case, the characteristics of each line can change upon each connection.

In order to overcome the adverse effects of variable line characteristics, it is known to use a device called an equalizer which, in effect, electrically counteracts or corrects the distortion caused by the line.

Equalizers fall into two broad catagories: fixed and adaptive. In a fixed equalizer, the average electrical characteristics of a telephone channel are determined and a fixed amount of equalization is then embodied in the equalizer to counteract any distorting characteristics of an average telephone channel. In an adaptive equalizer, the telephone channel is tested either upon its initial connection or between data transmission and corrections are made to the equalization characteristics (so-called equalizer coefficients) of the equalizer in order to counteract the detected distortions in the telephone channel.

Where there are a number of remote data generating/receiving stations, of necessity the central data processing apparatus must "poll" or look at each of the data communication channels in a predetermined sequence to enable the users of each of the remote stations to have access to the central station. If this polling is performed quickly enough the user of the remote station will not notice any appreciable lag in any response from the central station.

In prior art arrangements for polling modems, it has been the practice to provide each of the remote modems with a fixed equalizer and the central modem (connected to the data processing apparatus) with a plurality of equalizers associated with each of the plurality of transmission channels from the various remote polled modems. A training period is provided to adjust each of the central station equalizers to each channel. The appropriate equalizer at the central station is automatically switched for connection to the receive line of the central station when the polled remote station provides a response.

However, it will be appreciated that this arrangement requires a separate equalizer at the central modem for each data transmission channel and that the central station must know which channel it is polling at any given time so as to switch in the proper equalizer for that channel.

SUMMARY OF THE INVENTION

In a system in which a central modem individually polls a number of remotely located modems for data, an adaptive equalizer is provided in a central modem which develops a set of equalization coefficients for each remote modem during an initial training period. The coefficients are transmitted to the appropriate remote modem for storage. Upon transmission from the remote modem in response to a polled access, the stored coefficients set the adaptive equalizer of the remote modem before data is transmitted.

With the described arrangement, equalization is performed at the transmitter of the remote modem, rather than at the central modem. Thus, the storage of equalizer coefficients at the central modem, or the necessity of having a separate equalizer at the central modem for each data transmission channel, is eliminated. With the equalizer coefficients stored at the remote modem, the central modem does not need to know which remote site is being polled by a central data processor or data terminal. Since the remote modem being addressed already contains the correct equalizer coefficients following initial training, the central data processor and central modem require no special protocol or interface. This makes the construction of such a central modem station much simpler and less expensive.

BRIEF DESCRIPTION OF THE DRAWING FIGURES

These and other advantages and features of the present invention will be clear from the following detailed description of the preferred embodiment, when taken in conjunction with the drawing figures wherein:

FIG. 2 is a block diagram showing the details of a central modem and remote modem and associated data transmission channel constructed in accordance with the present invention;

FIG. 4 is a simplified representation of the transmitter, receiver and data transmission channel shown in FIG. 2; and FIGS. 5, 6, 7 and 8 show various equalizer arrangements for the remote transmitter.

DETAILED DESCRIPTION OF THE PREFERRED EMBODIMENTS

Figure 1:
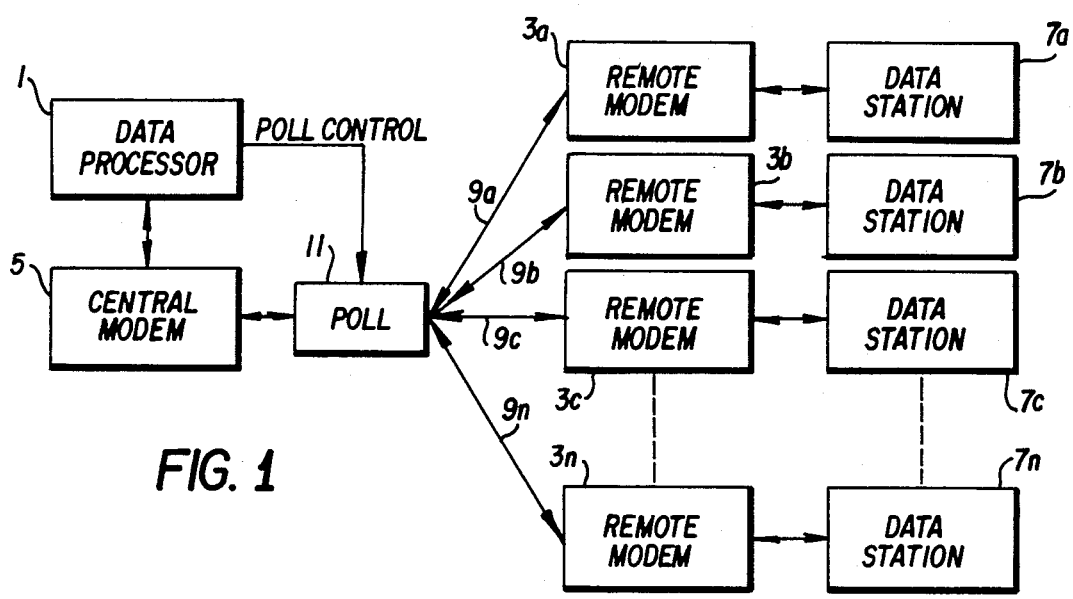
FIG. 1 shows a typical polling arrangement for modems in which the present invention is used.

In FIG. 1, a data processor 1 is connected to a plurality of remote modems 3a, 3b, 3c . . . 3n via a central modem 5. Each of the remote modems 3a-3n has associated with it a data station 7a, 7b, 7c . . . 7n, which for example can be a data entry terminal, video display unit, remote data acquisition device, etc. Each data station 7a-7n is characterized by having the capability of generating and/or receiving digital data. Since this digital data cannot be transmitted directly over a data transmission channel, such as a telephone line, each remote modem 3a-3n acts to convert these digital signals to a form which can be transmitted over each remote modem's associated data transmission channel 9a, 9b, 9c . . . 9n. For example, frequency modulation, phase modulation or amplitude modulation schemes which are well-known can be used to impress the data over a band limited telephone line.

The signals transmitted from the remote modems over their respective transmission channels are applied to a polling device 11 which is connected to central modem 5. The polling device periodically looks at each of the data transmission channels 9a-9n to see if a transmitted signal is present. If data is present the polling device will lock onto the channel and allow data from the transmitting remote modem to be applied to central modem 5. When data transmission is complete, the polling device will recommence its polling of the data transmission channels until another data present signal is detected. If it is desired to send a signal from the central modem to a particular remote modem, the polling device is given the address of the desired remote modem and selects the appropriate data transmission channel. Control of the polling device's operation can be by means of a logic sequencing unit or processor incorporated as part of the polling device, or can be done externally under the control of a data processor.

As will be recognized, in a polled modem arrangement where the data sources or terminals 7a-7n are connected over data transmission channels 9a-9n which may be part of a dial-up telephone network, the quality of each of the data transmission channels can vary from channel to channel. Each time a new channel is used, the electrical characteristics of that channel are likely to be different than those previously encountered. In order to obviate the distortion and degrading characteristics of these channels and to optimize data transmission thereover, it is necessary that some adjustment or equalization, as it is called, be performed for each channel in order to correct or compensate for such distortion.

In the past, in a polled modem arrangement, equalization has been accomplished by having a separate equalizer located at the central modem for each separate transmission channel. Typically, an initial training period is performed in which a sequence of test data is transmitted from the central modem to a remote modem and then retransmitted back to the central modem which then adjusts the coefficients of the equalizer associated with each data transmission channel. However, in this arrangement, a training period is required each time a new remote terminal is polled unless the required equalizer coefficients for each channel are stored at the central modem. This is disadvantageous because extra hardware is required for storage and the remote modem must recognize which remote terminal is being polled either by monitoring its transmitted data or by the use of a special interface with the data processor or terminal associated with the central modem. It can thus be seen that the provision of individual equalizers for each data transmission channel at the central modem and the storage of each of their associated equalizer coefficients can be unduly complex, especially where a large number of remote terminals are to be polled.

The present invention overcomes these problems by providing a single adaptive equalizer at the central modem and an adaptive equalizer with coefficient memory storage at each remote modem. A basic system embodying this principle is shown in FIG. 2. Initially, such as when the data transmission channels 9a-9n are established at the beginning of the day, the central modem 5 will, in turn, transmit a training sequence of test data from training sequence generator 13 over each data transmission channel. This training sequence is received by the receiver portion of the remote modem associated with the data transmission channel and then retransmitted back to the central modem. The equalizer 15a of the central modem then determines any distortions caused by the data transmission channel and develops a set of coefficients for its associated adaptive equalizer. This adaptive equalization process is well-known and need not be described in detail.

Figure 3:
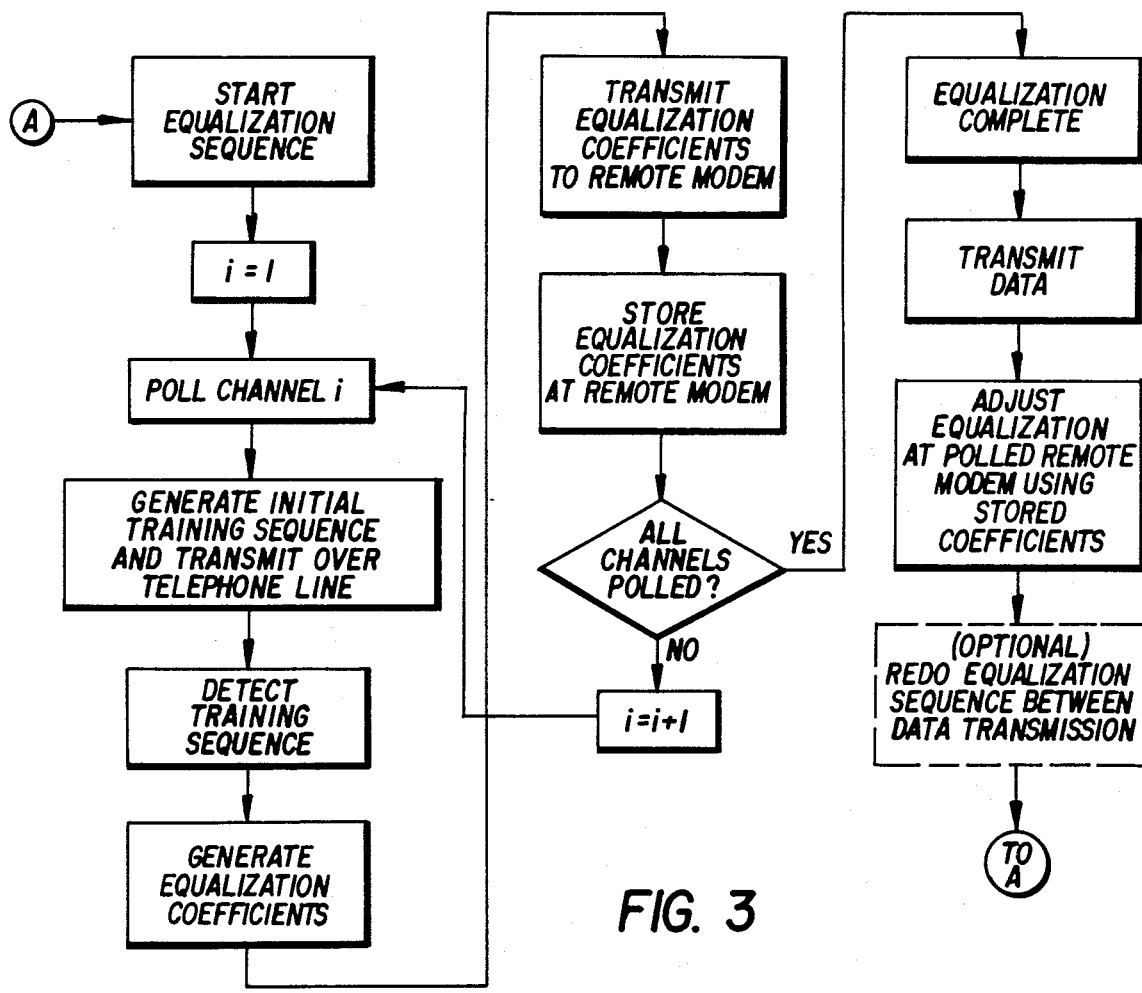
FIG. 3 is a flow chart showing the various steps involved in equalizing a series of polled modems in accordance with the present invention.

However, rather than store the equalizer coefficients for a particular data transmission channel at the central modem, these coefficients are transmitted as data over the data transmission channel to its associated remote modem which contains a memory device 17 (such as a random access memory) which then stores these coefficients. This initial training and set up of each data transmission channel and the development of equalizer coefficients which are transmitted and stored at the remote modem continues until all data transmission channels have been polled and the appropriate coefficients stored. In this fashion, each data transmission channel will be equalized at the remote modem end without the necessity for a cumbersome and complex equalization apparatus and procedures at the central modem. The training process can be repeated periodically to account for slow drifts in the characteristics of each data transmission channel. The sequence of steps used to accomplish equalization of all the data transmission channels is shown graphically in FIG. 3.

Adaptive equalizers can operate at either baseband or passband. If the central modem equalizer is the baseband type, its coefficients can be used directly in a baseband equalizer at the remote transmitter. If the central modem equalizer is a passband type, the equalizer coefficients can be modified to be used in a baseband equalizer at the remote modem. This is advantageous in digital implementations because it requires significantly less computation.

The operation of the polled modem arrangement will now be described in more detail. For illustration purposes, the transmitter-receiver arrangement shown in FIG. 2 shows a pair of modems which use quadrature amplitude modulation (QAM) with a passband adaptive equalizer at the receiver. Elements which are common to both a central modem 5 and a remote modem 3 have similar reference numerals. The system shown is designed for digital implementation and the techniques for so implementing are well-known to those skilled in the art.

As shown in FIG. 2, the binary transmit data from a data terminal is presented to the transmitter of either the central modem 5 or remote modem 3. Taking for example a data rate of 9600 bits per second, an encoder 19a or 19b accepts consecutive groups of K data bits and generates the two signals $a_I(t)$ and $a_Q(t)$. The first signal, $a_I(t)$, is called the inphase signal and the second signal, $a_Q(t)$, is called the quadrature signal. If it is assumed that K=4, then a new group of K bits is accepted $9600/4 = 2400 = f_s$ times per second. The quantity $f_s$ is called the baud rate and $T = 1/f_s$ is the baud duration. The signals $a_I(t)$ and $a_Q(t)$ can take on only a discrete set of amplitudes and change only at times nT. If K=4, then $2^4 = 16$ distinct pairs $(a_I(nT), a_Q(nT))$ are required. For example, they could each have allowed values of $-3, -1, 1,$ and 3 resulting in $4 \times 4 = 16$ pairs.

The signals $a_I(t)$ and $a_Q(t)$ must be filtered to provide a signal with the appropriate bandwidth. The filtering process can be modelled by forming the sampled signals $$a_I^*(t) = \sum_{n=-\infty}^{\infty} a_I(nT)\delta(t - nT) \quad (1)$$

and $$a_Q^*(t) = \sum_{n=-\infty}^{\infty} a_Q(nT)\delta(t - nT)$$

where $\delta(t)$ is a Dirac delta function and applying them to a pair of baseband shaping filters 21a,23a or 21b,23b. These filters have a transfer function $G(\omega)$ and impulse response $g(t)$ selected to achieve the appropriate bandwidth and no inter-symbol interference. The filter outputs are $$b_I(t) = \sum_{k=-\infty}^{\infty} a_I(kT)g(t - kT) \quad (2)$$

and $$b_Q(t) = \sum_{k=-\infty}^{\infty} a_Q(kT)g(t - kT)$$

They are called the inphase and quadrature baseband signals, respectively. These signals have a lowpass spectrum which is not suitable for transmission over a typical bandpass channel like a voiceband telephone link. They are converted to a bandpass signal c(t) by the amplitude modulation process performed by multipliers 25a,27a or 25b,27b and as described by the equation $$c(t) = b_I(t) \cos \omega_o t - b_Q(t) \sin \omega_o t \quad (3)$$

The filtering and modulation preferably are performed digitally. Samples of the modulated signal are computed numerically using binary arithmetic. The samples are then converted to analog values, filtered, and applied to the channel. To simplify the final analog filter requirements, several modulated signal samples are generated each baud. As shown in FIG. 2, N samples are generated per baud. N might be chosen to be 8 in a typical implementation. These values can be computed as $$c(nT/N) = b_I(nT/N)\cos(\omega_o nT/N) - b_Q(nT/N)\sin(\omega_o nT/N) \quad (4)$$

$$= \sum_{k=-\infty}^{\infty} a_I(kT)g[(n - Nk)T/N]\cos(\omega_o nT/N) -$$

-continued $$\sum_{k=-\infty}^{\infty} b_Q(kT)g[(n - Nk)T/N]\sin(\omega_o nT/N)$$

The baseband shaping filter impulse response g(t) has finite duration so that the sums reduce to finite ones.

The final step of converting the samples to a continuous time signal can be modelled by applying the signal $$c^*(t) = \sum_{n=-\infty}^{\infty} c(nT/N)\delta(t - nT/N) \quad (5)$$

to the reconstruction filter $H(\omega)_a$ or $H(\omega)_b$. The reconstruction filter includes a sample-and-hold circuit cascaded with an analog lowpass filter that passes the modulated signal spectrum. The output signal s(t) is applied to the analog channel 9n through polling device 11.

At the receiver of either the central modem or remote modem, the channel output r(t) is applied to a Hilbert transform filter 29a or 29b resulting in the signal $\check{r}(t)$. Both r(t) and $\check{r}(t)$ are then applied to the passband equalizer 15a or 15b. The passband equalizer is a transversal filter with complex coefficients and tap spacing equal to the baud period T. Its input and output samples are related by the equation $$v_I(nT) + jv_Q(nT) = \sum_{k=0}^{M} (f_k + j\check{f}_k)[r(nT - kT) + j\check{r}(nT - kT)] \quad (6)$$

where $f_k$ and $\check{f}_k$ are the real and imaginary parts of the filter tap coefficients.

The equalizer output is demodulated by complex multiplier 31a or 31b which perform the complex multiplication $$y_I(nT) + jy_Q(nT) = [v_I(nT) + jv_Q(nT)][\cos\omega_o nT - j\sin\omega_o nT] \quad (7)$$

The resulting signals $y_I(nT)$ and $y_Q(nT)$ are then passed to a slicer and decoder circuit 33a or 33b that performs the inverse function of the encoder in the transmitter.

The link can be represented more compactly using complex signal notation. Each pair of inphase and quadrature signals are considered to be a complex number. In particular, let $$\begin{align}A(t) &= a_I(t) + ja_Q(t) \quad (8)\\B(t) &= b_I(t) + jb_Q(t)\\e^{\pm j\omega_o t} &= \cos\omega_o t \pm j\sin\omega_o t \quad (9)\\R(t) &= r(t) + j\check{r}(t)\\F_k &= f_k + j\check{f}_k\\V(t) &= v_I(t) + jv_Q(t)\\\text{and}&\\Y(t) &= y_I(t) + jy_Q(t)\end{align}$$

This simplified representation of the data transmission link is shown in FIG. 4.

As will be recognized, the filters in a cascade can be arranged in any order without changing the overall transfer function. Thus the cascade of the reconstruction filter $H(\omega)$, channel, and passband equalizer 15 shown in FIG. 4 can be rearranged with the equalizer first as shown in FIG. 5. Since the passband equalizer is a tapped delay line with tap spacing T, it can be transferred to the left of the sampler as shown in FIG. 6. In this position, the equalizer output would have to be computed N times per baud. Its continuous time output is $$x(t) = \sum_{k=0}^{M} F_k C(t - kT) = \sum_{k=0}^{M} F_k B(t - kT)e^{j\omega_o(t-kT)} = \quad (10)$$

$$e^{j\omega_o t} \sum_{k=0}^{M} \overline{F}_k B(t - kT)$$

where $\overline{F}_k = F_k e^{-j\omega_o kT}$ for $k = 0, \ldots, M$

Thus, the equalizer can be moved to the left of the modulator as shown in FIG. 7 if the tap coefficients are modified from $F_k$ to $\overline{F}_k$ as defined in the previous sentence. The transfer function of the resulting tapped delay line is $$\overline{F}(\omega) = \sum_{k=0}^{M} \overline{F}_k e^{-j\omega kT} = F(\omega + \omega_o) \quad (11)$$

and is represented by the lowpass complex equivalent filter 35.

Finally filter 35 can be moved to the position shown in FIG. 8. At this location, its output needs to be computed only once per baud. This represents a factor of N reduction in computation over locating the filter after the modulator as in FIG. 6.

While the present invention has been described in considerable detail, it is understood that various changes and modifications would be apparent to those skilled in the art. Accordingly, the foregoing detailed description is intended to be illustrative, but not limitative of the invention which is defined by the appended claims.

I claim:

1. In a data transmission system of the type including a central data transmitter-receiver linked to a plurality of remote data transmitter-receivers via separate data transmission channels, each channel having varying electrical characteristics, the central data transmitter-receiver including means for polling each of the data transmission channels, the system further comprising:
    an automatic equalizer at the central data transmitter-receiver;
    and automatic equalizer at each of the remote data transmitter-receivers;
    means at the central data transmitter-receiver for generating an initial training sequence of data signals, for transmitting the training sequence, in turn, over each data transmission channel, for detecting the electrical characteristics of each data transmission channel, generating equalization coefficients suitable for adjusting the characteristics of the data transmission channel in a preferred manner, and for transmitting as data the equalization coefficients associated with each data transmission channel to its associated remote data transmitter-receiver; and
    means at each remote data transmitter-receiver for storing the transmitted equalization coefficients associated with its data transmission channel,
    whereby each data transmission channel is automatically equalized by the qualizer associated with its respective remote date transmitter-receiver whenever the particular data transmission channel is polled by the central data transmitter-receiver.

2. The data transmission system of claim 1 wherein each said data transmitter-receiver is a modem.

3. In a data transmission system of the type including a central data transmitter-receiver linked to a plurality of remote data transmitter-receivers via separate data transmission channels, each channel having varying electrical characteristics, the central data transmitter-receiver including means for polling each of the data transmission channels, and each remote transmitter-receiver including automatic equalizer means, a method for equalizing the electrical characteristics of each of the data transmission channels, comprising the steps of:
    (a) generating an initial training sequence of data and transmitting this training sequence data over a data transmission channel;
    (b) detecting at the central data transmitter-receiver the training sequence data and generating therefrom equalization coefficients characterizing the data transmission channel;
    (c) transmitting as data the equalization coefficients characterizing the data transmission channel from the central data transmitter-receiver to the remote data transmitter-receiver;
    (d) storing the transmitted equalization coefficients for the channel at the remote data receiver-transmitter;
    (e) repeating steps (a)-(d) until all data transmission channels have had equalization coefficients generated and stored; and
    (f) adjusting the equalization of each equalizer associated with each remote data transmitter-receiver in accordance with the stored equalization coefficients associated therewith whenever a remote data transmitter-receiver is polled by the central data transmitter-receiver.

4. The system of claim 3 further including the step of periodically repeating steps (a)-(e) between transmission of data over the data transmission channels.

5. The system of claim 3 wherein the step of generating an initial training sequence of data is performed at the central data transmitter-receiver, and each remote transmitter-receiver, in turn, receives the initial training sequence and retransmits it back to the central data receiver-transmitter.

* * * * *